United States Patent [19]

Darby

[11] Patent Number: 5,025,316

[45] Date of Patent: Jun. 18, 1991

[54] VIDEO NOISE REDUCTION SYSTEM WITH MEASURED NOISE INPUT

[75] Inventor: Ted A. Darby, Knoxville, Tenn.

[73] Assignee: North American Philips Corporation, New York, N.Y.

[21] Appl. No.: 433,059

[22] Filed: Nov. 6, 1989

[51] Int. Cl.⁵ .......................................... H04N 5/213
[52] U.S. Cl. ..................................... 358/167; 358/105
[58] Field of Search .................. 358/167, 36, 166, 37, 358/105

[56] References Cited

U.S. PATENT DOCUMENTS

| | | |
|---|---|---|
| 3,333,055 | 5/1964 | Krause . |
| 4,167,749 | 9/1979 | Burrus . |
| 4,249,209 | 2/1981 | Storey . |
| 4,249,210 | 2/1981 | Storey et al. . |
| 4,296,436 | 10/1981 | Achiha . |
| 4,437,124 | 3/1984 | Cochran . |
| 4,459,613 | 7/1984 | Faroudja ............................ 358/167 |
| 4,485,403 | 11/1984 | Illetschko . |
| 4,539,594 | 9/1985 | Illetschko . |
| 4,573,075 | 2/1986 | Bolger . |
| 4,796,088 | 1/1989 | Nishimura et al. ................ 358/167 |
| 4,873,574 | 10/1989 | Darby ................................ 358/167 |

Primary Examiner—Howard W. Britton
Assistant Examiner—David E. Harvey
Attorney, Agent, or Firm—Edward W. Goodman

[57] ABSTRACT

A television receiver includes a motion detection circuit which compares corresponding portions of the picture signal from adjacent fields or frames and based on this comparison generates movement signals. In addition, the television receiver includes a noise measurement circuit which compares corresponding portions of succeeding scanning lines, these corresponding portions having identical contents with the exception of any added noise, accumulates the results of these comparisons, and output the accumulated results at the end of each field as a noise signal. The motion signals and the noise signal are then applied as control signals to an adjustable noise reduction circuit for reducing the noise content in the television signal.

3 Claims, 5 Drawing Sheets

VIDEO NOISE REDUCTION SYSTEM WITH MEASURED NOISE INPUT

BACKGROUND OF THE INVENTION

1. Field of the Invention

The present invention relates to systems for reducing the visibility of noise in video displays.

1. Description of the Related Art

The problem of reducing the visibility of noise in television displays has been addressed for many years. Various noise reducing circuits are known. A first type of system operates on the coring principle, i.e. the incoming video signal is separated into high frequency components and low frequency components, the high frequency components containing the noise to be reduced. The high frequency component is then passed through a threshold circuit which eliminates signal components having an amplitude less than the threshold value. The resulting cored signal is then recombined with the low frequency component to provide the noise reduced video signal. An example of this type of circuitry with bidimensional noise reduction may be found in U.S. Pat. No. 4,142,211 of Yves Faroudja. This patent is hereby incorporated by reference into the present application. A good summary of the systems for noise reduction by use of coring circuits prior to 1977 may be found in that patent.

Another basic approach to solving the noise visibility problem in video displays includes storing a television field or frame, comparing the present or incoming pixel values to the corresponding stored pixel values and adding the two signals together in a ratio determined by the result of the comparison. For high differences between the present and the stored value only the present value is utilized. As the difference decreases, an increasing percentage of the stored value is used. In this type of system it is assumed that relatively large differences between corresponding points in adjacent or nearly adjacent frames or fields result from motion. In the presence of motion, noise is tolerated, while for stationary areas of the picture, a larger noise reduction takes place. An example of this type of system is taught in U.S. Pat. No. 4,107,739 to Rossi et al. Many variations of this type of circuit are known. (See, e.g. U.S. Pat. Nos. 4,107,739; 4,064,530).

Both of the above types of noise reducing circuits are based on the assumption that it is impossible or excessively difficult to isolate a true noise element from changes in pixel values resulting from motion. It is therefore possible that low level motion signals are mistakenly identified as noise and are suppressed, while high level noise signals are retained, based on the assumption that they are motion signals.

The only patent known to applicant in which an attempt is made to measure actual noise and utilize this in a noise reduction circuit is U.S. Pat. No. 4,189,755 to Balbes et. al. The noise measuring method in this patent differs from that of the present invention since no comparison between the back porch signal (or the color burst signal) from one scan line to the same signal from another scan line is carried out. Further, the measured noise signal is used as part of a signal-to noise ratio signal in response to which the bandwidth of the receiver is adjusted. This method is particularly suitable for the frequency modulated TV signals used in satellite transmissions.

SUMMARY OF THE INVENTION

It is an object of the present invention to alleviate the above-mentioned difficulties in the known systems by allowing the noise reduction system to operate, in part, in dependence on a measured noise signal.

The measured noise signal is preferably generated by comparing the signal value at instants of the received television signal which would have the same value at each occurrence but for the noise. This may be, for example, the back porch of the horizontal synchronization signal, or corresponding points on the color burst.

The present invention also provides for processing means which are connected to the receiving means for processing the television signal to decrease the noise content thereof. The processing means are connected to the measuring means so that processing of the received television signal takes place, at least in part, under control of the measured noise signal.

BRIEF DESCRIPTION OF THE DRAWINGS

The present invention may best be understood by reference to the following description of a preferred embodiment when considered in conjunction with the drawings, in which.

DESCRIPTION OF THE PREFERRED EMBODIMENTS

Figure 1:
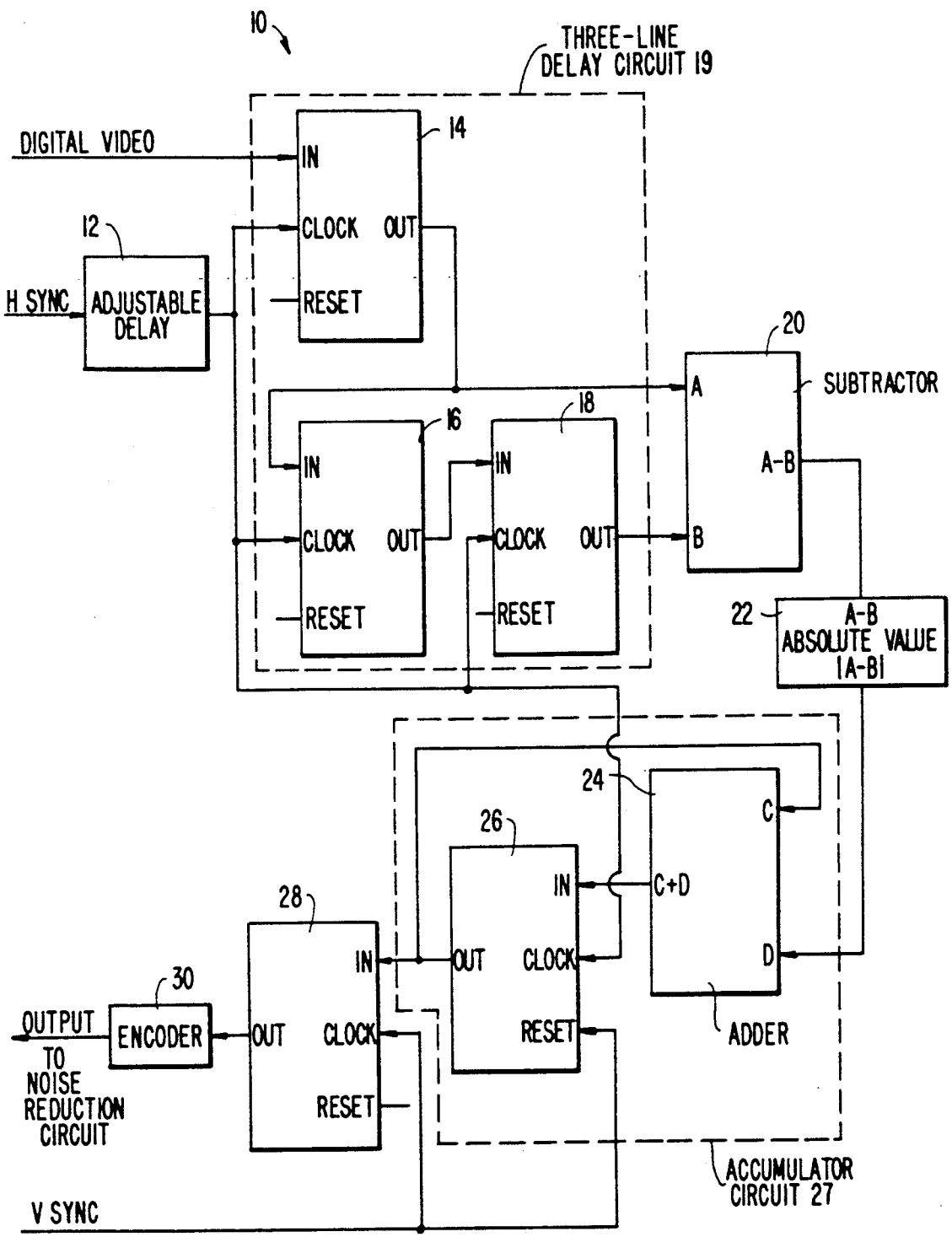
FIG. 1 is a block diagram of a prior art noise measurement

FIG. 1 shows a noise measurement circuit which is disclosed in U.S. Pat. No. 4,873,574 to Darby, which is incorporated by reference. THis circuit receives a horizontal synchronizing (H sync) pulse and a digitized picture signal from a composite television signal.

Figure 1A:
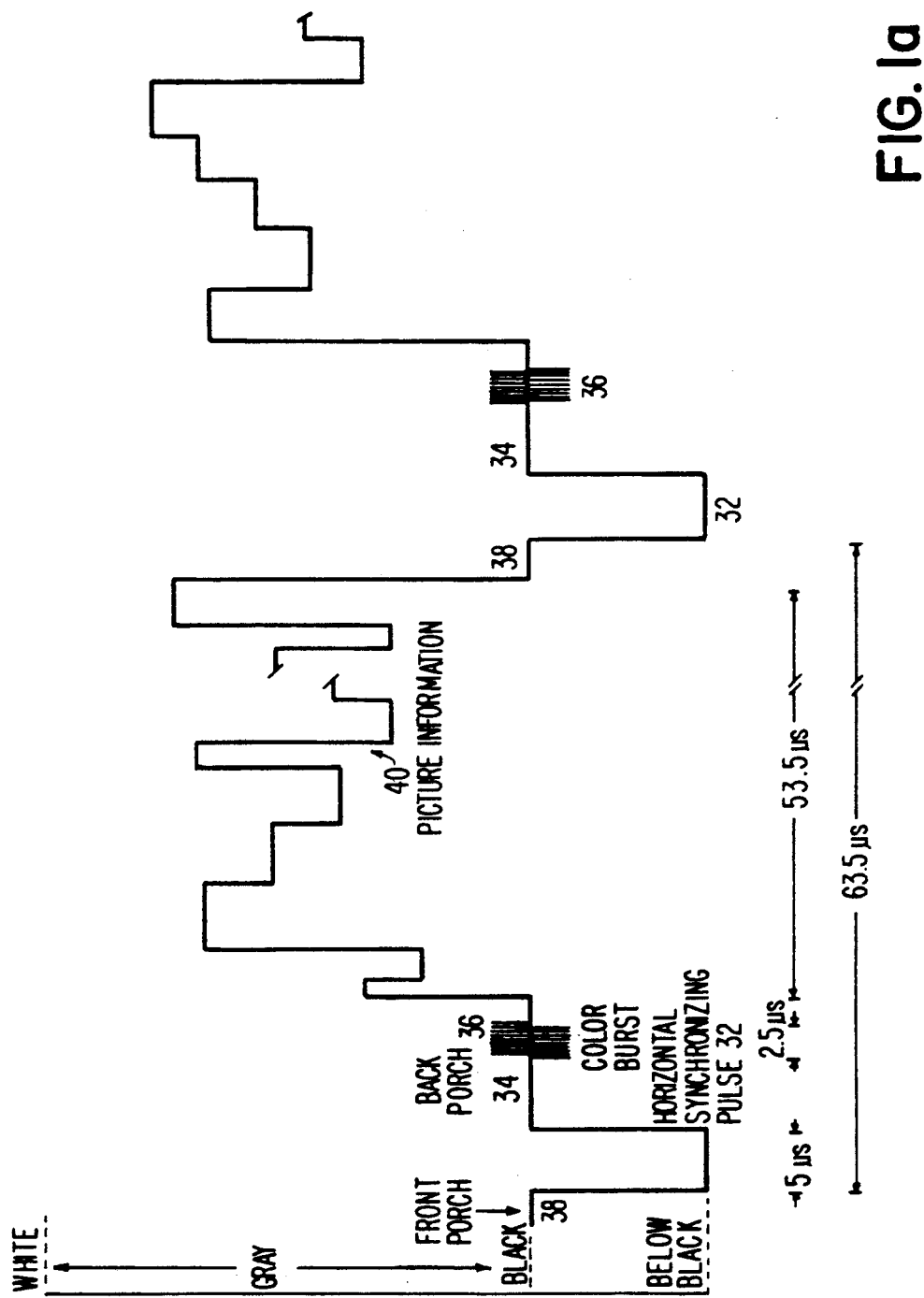
FIG. 1a shows a timing diagram of a composite television picture signal.

FIG. 1a shows a timing diagram of the composite television picture signal which includes a H sync pulse 32 which occurs once in each video scanning line H sync pulse 32 is followed in time by a back porch signal 34 and the color burst signal 36 (in a color composite television picture signal). The H sync pulse 32 is preceded in time by a front porch signal 38. Picture information 40 is at various voltage levels representative of luminance between black and white. In FIG. 1 the H sync pulse 32 is applied to an adjustable delay circuit 12. The H sync pulse 32 is used a a time adjustable clock pulse during the measurement of the noise on a composite television picture signal. The time adjustment of the width and the adjustable time delay of the H sync pulse 32 allow sampling of any particular part of the composite television picture signal when the adjusted and delayed signal is used as a clock pulse. The adjustable delay circuit 12 is adjusted to sample the back porch signal 34 or the color burst signal 36. The digitized video signal is applied to an 8-bit delay flip-flop circuit 14. When the H sync pulse 32 from the adjustable delay circuit 12 is applied to the clock input of the flip-flop circuit 14, there is an output of a portion of the digitized video from the flip-flop circuit 14. The portion of the digitized video signal that is outputted is determined by the time delay of the adjustable delay circuit 12. The H sync pulse 32 is adjusted in time so that the back porch signal 34 or the color burst signal 36 is the output from the flip-flop circuit 14. The output of the flip flop circuit 14 is then applied to an 8-bit delay flip-flop circuit 16 which also uses the delayed H sync pulse 32 as a clock pulse. The output of the flip-flop circuit 16 is applied to an 8-bit delay flip-flop circuit 18. Again, the H sync pulse 32 from the adjustable delay circuit 12 is used as a clock pulse in the flip-flop circuit 18.

The combination of flip-flop circuits 14, 16 and 18 constitutes a three-line delay circuit 19. For example, if a signal from a portion of video line 1 (i.e. the back porch or the color burst signal) is at the output of the flip-flop circuit 18, then a signal from a corresponding portion of video line 2 is on the output of the flip-flop circuit 16 and a signal from a corresponding portion of video line 3 is at the output of the flip-flop circuit 14. The output of the flip-flop circuit 14 is also applied to one input of a subtractor circuit 20 and the output of the flip-flop circuit 18 is applied to the other input of the subtractor circuit 20. The output of the subtractor circuit 20 is the difference between the signal on alternate video lines. The signals on alternate video lines, therefore, are being compared.

The "standard" signal on all of the video lines (the back porch or color burst signal) would be identical from video line to video line if there were no noise on the signal. Therefore, the difference between the standard signals on two alternate lines should represent the noise on the composite television picture signal. Alternate lines are compared since the phase of the color burst signal is shifted 180 degrees between successive video lines.

If there is no color burst signal, i.e. the received signal is a black and white composite television picture signal, there is no need for the flip-flop circuit 18 and the output of the flip-flop circuit 16 may be applied directly to the second input of the subtractor circuit 20. On the other hand, there is no problem caused by the introduction of an additional delay flip-flop circuit when back porch signals are being compared.

The difference signal output from the subtractor circuit 20 is applied to the input of an absolute value circuit 22. The output of the absolute value circuit 22 is the absolute value of the difference between the two video lines being compared. This output is applied to one input of a 16-bit adder circuit 24. The output of the adder circuit 24 is applied to a 16-bit delay flip flop circuit 26 whose output is applied to the second input of the 16-bit adder circuit 24. The combination of the adder circuit 24 and the flip-flop circuit 26 constitutes an accumulator circuit 27 for the accumulation of the absolute value signals from absolute value circuit 22 by the recursive addition of the output of the adder 24 to the output of the absolute value circuit 22. Alternate video line comparisons are added together, i.e. the comparison of lines 1 and 3 are added to the comparisons of lines 3 and 5, the sum of which is added to the comparisons of lines 5 and 7 and so forth. Again, the clock pulse for the flip-flop circuit 26 is the H sync pulse from the adjustable delay circuit 12. The output of the delay flip-flop circuit 26 is also applied to a delay flip-flop circuit 28. Preferably, the clock pulse for delay flip-flop circuit 28 is the vertical synchronization (V sync) pulse and the V sync pulse is also used as a reset pulse for flip-flop circuit 26. When the V sync pulse occurs, once per video field, delay flip-flop circuit 28 is triggered to output the accumulated comparisons to an encoder circuit 30. At the same time, the V sync pulse resets flip-flop circuit 20. The encoder circuit 30 applies the accumulated comparisons as a noise signal to the noise reduction circuit in the television receiver. The accumulation of the comparisons for the next video field then begins again.

Figure 2:
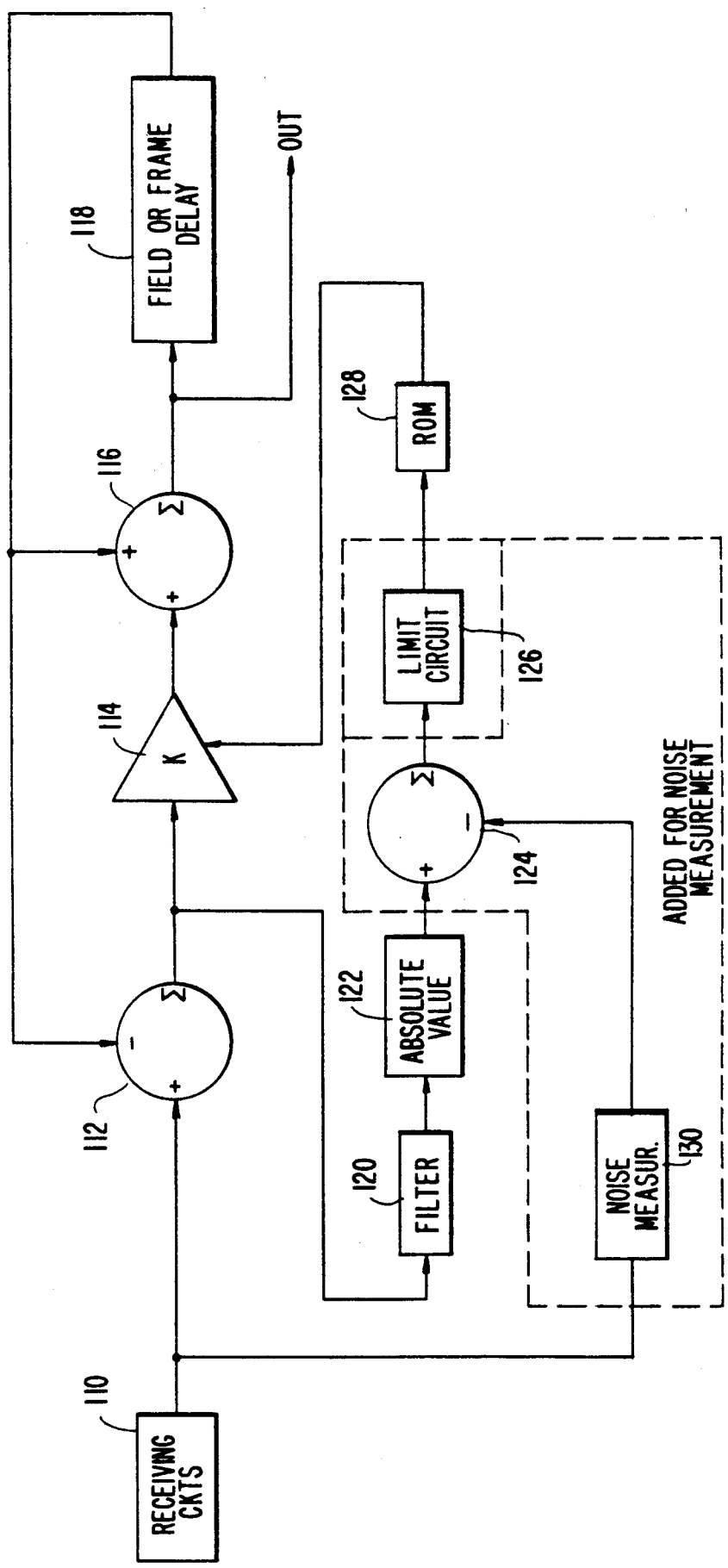
FIG. 2 is a block diagram of a noise reducing circuit connected to the noise measurement circuit of FIG. 1.

FIG. 2 shows the noise measurement circuit 130 of FIG. 1 interconnected with a typical noise reducing circuit of the movement-sensitive type. An amplitude modulated television signal received in receiving circuits 110 and converted to baseband in these circuits, is applied to the positive input of a subtraction stage 112. The output of subtraction stage 112 is applied to a k-factor multiplier 114, e.g. an amplification stage with amplification factor k. The output of stage 114 is applied to an adder circuit 116 whose output is connected to a field or frame delay 118. The output of frame delay 118 is fed back both to the subtraction input of stage 112 and the second adder input of stage 116.

The output of subtraction stage 112 is also applied to a filter 120 whose output is converted to an absolute value in an absolute value stage 122. The output of stage 122 is connected to the positive input of a second subtraction stage 124. The output of subtraction stage 124 is connected to a limit circuit 126 whose output is, in turn, connected to a noise reduction curve memory ROM 128. The output of ROM 128 is applied to a control input of stage 114.

Finally, the output of receiving circuits 110 is also applied directly to the input of noise measurement circuit 130, which is the above-described circuit of FIG. 1. As discussed above, noise measurement circuit 130 furnishes a noise signal signifying the absolute value of noise in the received signal during the previous field. Other noise-related values could be used. The output of stage 130 is connected to the subtrahend input of subtraction stage 124.

The output of the noise reducing system with measured noise dependence in accordance with the present invention is derived from the output of stage 116.

The noise reduction circuit of FIG. 2 operates in the manner described below. It is merely an example of a motion-dependent noise reducing circuit. The particular circuit illustrated is recursive and uses either a field or a frame delay. Non-recursive circuits and circuits with different delays can benefit equally from incorporation of the measured noise signal in accordance with the present invention. Also, the noise measurement circuit, while preferably the one disclosed in U.S. Pat. No. 4,873,574, may be any type now known or later developed.

In the noise reducing circuit of FIG. 2, each received pixel value of the incoming TV signal is compared to the corresponding value delayed by one field or one frame. The difference between the two values is, in the absence of noise, indicative of movement in the picture to be displayed. This difference is multiplied by a k-factor in stage 114. The selection of the proper k-factor will be discussed below. The amplified difference signal is added to the delayed input signal in stage 116. The output of stage 116 therefore satisfies the following equation:

$$K(V_R - V_D) + V_D = V_O \text{ or}$$

$$k V_R + (1-k) V_D V_O \text{ where}$$

VR = Received pixel value;

VD = Delayed pixel value; and

VO = Output pixel value.

The k-factor is selected by reading out a value from a k selector curve stored in ROM 128. The address for ROM 128 is furnished by limit circuit 126 whose output varies as a function of the difference between the movement signal (i.e. the signal resulting from the subtraction of the stored pixel value, $V_D$, from the present pixel VR) value and the measured noise signal. The limit circuit 126 furnishes the address which results in readout of the proper k-factor.

Figure 3:
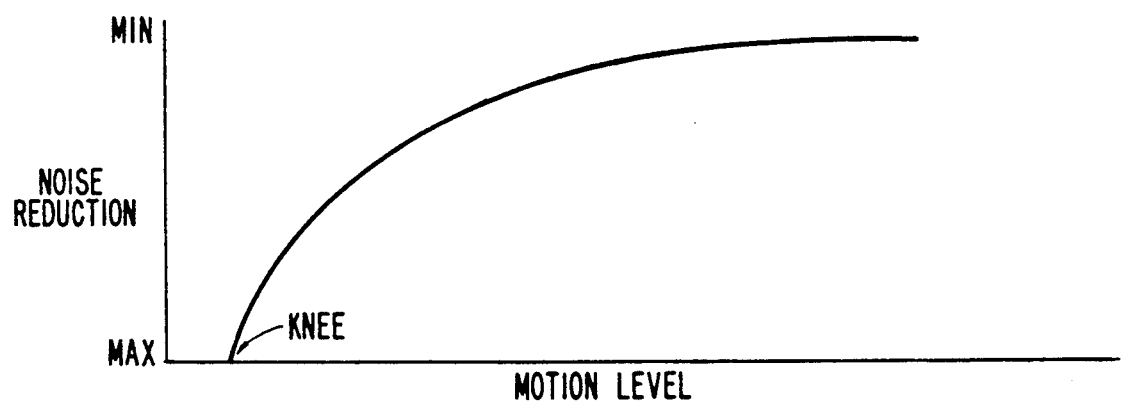
FIG. 3 is a curve of noise reduction vs. motion level.

In FIG. 3, a curve of noise reduction versus motion level is shown. The k-factor increases with decreasing noise reduction. Above a selected motion level the k-factor becomes 1 or slightly less than 1, i.e. the output pixel value, $V_O$, is equal to or slightly less than the received pixel value. Little or no noise reduction takes place.

Figure 3A:
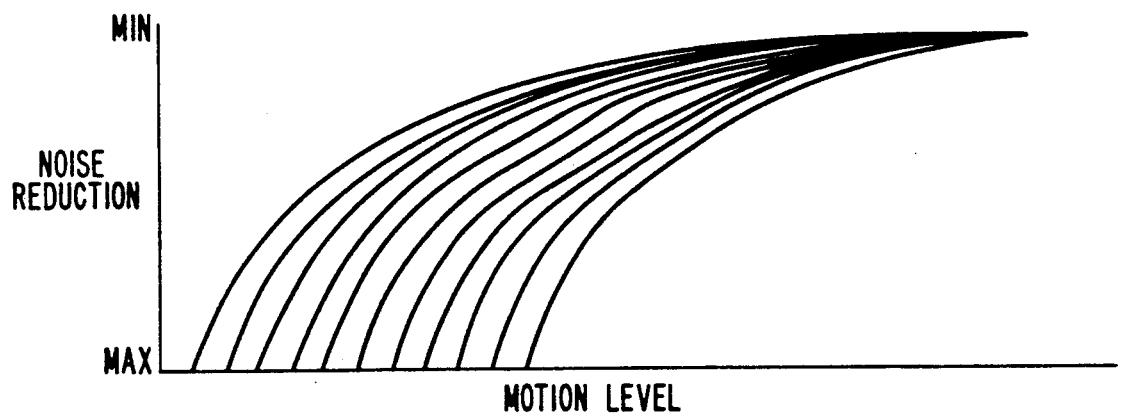
FIG. 3a is a set of curves of noise reduction vs. motion level for different noise levels.

The effect of the measured noise signal is to decrease the apparent motion level by the amount of noise present. In some known noise reducing circuits, ROM 128 carries two curves, one for low noise and one for high noise. The viewer can switch from one to the other to yield the display that is most acceptable to him. The noise compensation according to the present invention, on the other hand, adjusts itself automatically and immediately to the measured noise level. In essence, combining the noise signal with the motion signal is equivalent to the storage of numerous curves in ROM 128. (FIG. 3a). Effectively, the different measured noise values can be thought of as displacing the knee of the curve along the abscissa. It should be noted that the origin of the curve, i.e. the vertical intercept of the abscissa, marked "Max" is not, generally speaking, a k-factor of zero.

Figure 4:
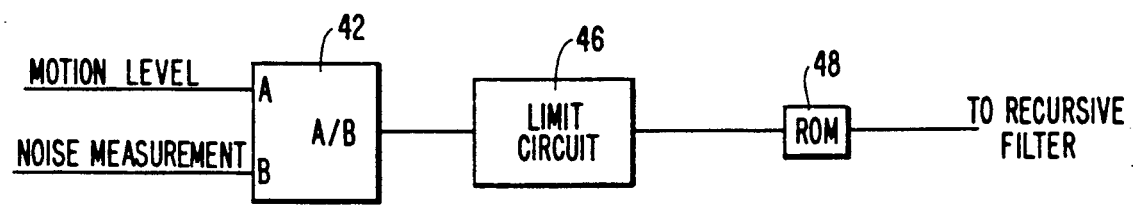
FIG. 4 is a block diagram of an alternative embodiment of a circuit combining motion level and noise measurements.

In another embodiment, the relevant portions of which are shown in FIG. 4, the subtraction circuit 124 is replaced by a divider 42, the dividend being the motion level and the divisor being the measured noise. Thus, the divider circuit 42 divides the motion level signal by the noise measurement signal. The divider output signal is applied to a limit circuit 46 which, again, furnishes the required address to a ROM 48. This arrangement varies the slope as well as the position of the curve depending on the noise level. It has been found very effective on video scenes without fast movement, e.g. x-rays.

Figure 5:
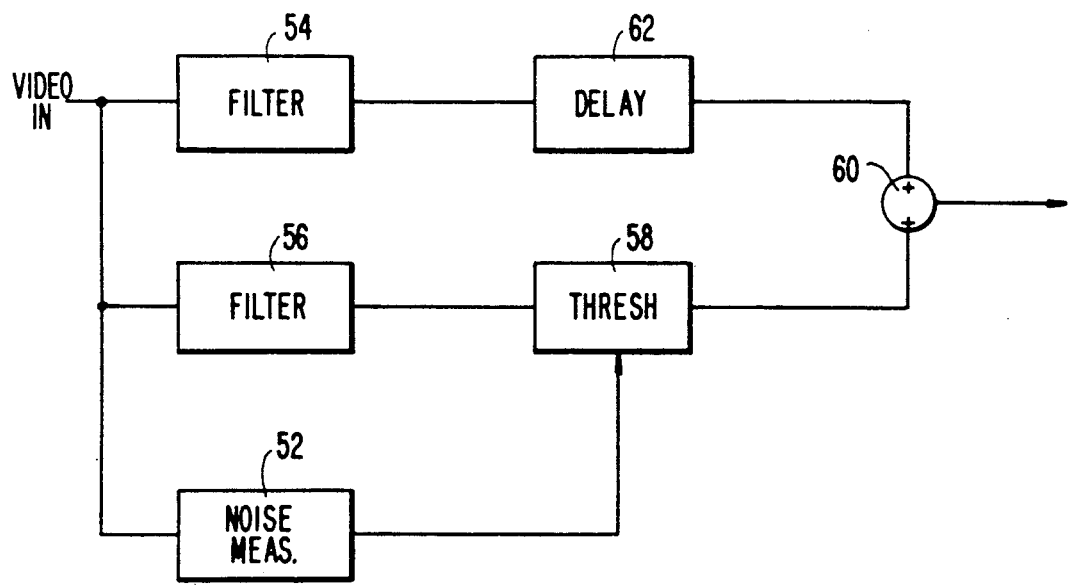
FIG. 5 is a block diagram of a noise measurement circuit connected to a coring type noise reducing circuit.

FIG. 5 is a simplified block diagram showing the noise measurement circuit of FIG. 1, labelled 52 in FIG. 5, interconnected to a coring type noise reducing circuit. Specifically, the video signal is applied to a low-pass filter 54, a high-pass filter 56, and the noise measurement circuit 52. The high frequency component at the output of filter 56 is applied to a threshold circuit 58. The actual threshold varies as a function of the output of noise measurement circuit 52. For example, the output voltage from noise measurement circuit 52 could be applied across a potentiometer whose tap determines the threshold value at which threshold circuit 58 begins to transmit signals. The signals passing threshold circuit 58 are applied to one input of a summing circuit 60. The other input of summing circuit 60 is connected through a delay 62 to the output of low-pass filter 54. Delay 62 serves to match the delay through threshold circuit 58 and may be omitted if that delay is negligible. The output of summing circuit 60 is a video signal whose noise component has been reduced i accordance with a measured noise value.

Variations of the noise measurement circuit and of the noise reducing circuit of the preferred embodiments described herein will readily be apparent to one skilled in the art and are intended to be encompassed in the following claims.

I claim:

1. Television receiver apparatus, comprising:

receiving means for receiving a television signal having noise superimposed thereon and for furnishing a received television signal in response thereto;

first means connected to said receiving means for generating a noise signal varying, at least in part, in accordance with the amplitude of said superimposed noise;

second means connected to said receiving means for generating movement signals indicative, at least in part, of desired changes in said television signal resulting from actual changes in the television image; and processing means, connected to said first means and said second means, for forming, in response to said noise signal and said movement signals, an output television signal having a noise content adjustably reduced from that in said received television signal, said processing means comprising a noise reduction circuit coupled to said second means for forming said output television signal with said noise content being adjusted in response to a control signal applied to a control input of said noise reduction circuit, and control signal generating means comprising subtraction means connected to said first means and said second means for subtracting said noise signal form said movement signals, an output of said subtraction means being coupled to said control input of said noise reduction circuit.

2. Television receiver apparatus, comprising:

receiving means for receiving a television signal having noise superimposed thereon and for furnishing a received television signal in response thereto;

first means connected to said receiving means for generating a noise signal varying, at least in part, in accordance with the amplitude of said superimposed noise;

second means connected to said receiving means for generating movement signals indicative, at least in part, of desired changes in said television signal resulting from actual changes in the television image; and processing means, connected to said first means and said second means, for forming, in response to said noise signal and said movement signals, an output television signal having a noise content adjustably reduced from that in said received television signal, said processing means comprising a noise reduction circuit coupled to said second means for forming said output television signal with said noise content being adjusted in response to a control signal applied to a control input of said noise reduction circuit, and control signal generating means comprising dividing means connected to said first means and said second means for dividing said movement signals by said noise signal, an output of said dividing means being coupled to said control input of said noise reduction circuit.

3. Television receiver apparatus as claimed in claim 1 or 2, characterized in that said first means for generating a noise signal comprises:

means for delaying said television signal for at least one scanning line;

means for comparing corresponding portions of said television signal and said delayed television signal, said corresponding portions containing identical information with the exception of noise content;

means for accumulating the results of said comparison; and means for outputting said accumulated results at the end of each field in said television signal, whereby said accumulated results in said noise signal.

* * * * *